United States Patent [19]
Randerson

[11] 3,928,090
[45] Dec. 23, 1975

[54] HEAT TREATMENT OF STEEL

[75] Inventor: Keith Randerson, Middlesbrough, England

[73] Assignee: British Steel Corporation, London, England

[22] Filed: Mar. 8, 1973

[21] Appl. No.: 339,309

[30] Foreign Application Priority Data
Mar. 9, 1972 United Kingdom............ 11087/72

[52] U.S. Cl................ 148/134; 148/143; 148/144; 148/153; 148/155; 148/156; 148/157
[51] Int. Cl.²........................................ C21D 1/18
[58] Field of Search......... 148/143, 144, 153, 155, 148/156, 157, 134

[56] References Cited
UNITED STATES PATENTS
3,629,015 12/1971 Yonezawa et al.................. 148/143
3,756,869 9/1973 Melloy et al....................... 148/143

FOREIGN PATENTS OR APPLICATIONS
1,226,564 3/1971 United Kingdom

Primary Examiner—R. Dean
Attorney, Agent, or Firm—Bacon & Thomas

[57] ABSTRACT

A steel body at red heat or higher temperature is heat treated by sequentially carrying it through a descaling unit, where scale is removed by water jets at an impact force above 2.5 kg/cm², and then into an accelerated cooling process such as a quench rig where it is cooled rapidly down through its transformation temperature. If the temperature is below transformation after descaling the steel body is reheated without new scale formation before passing to accelerated cooling. Cooling water and surface quality are thereby improved.

13 Claims, 1 Drawing Figure

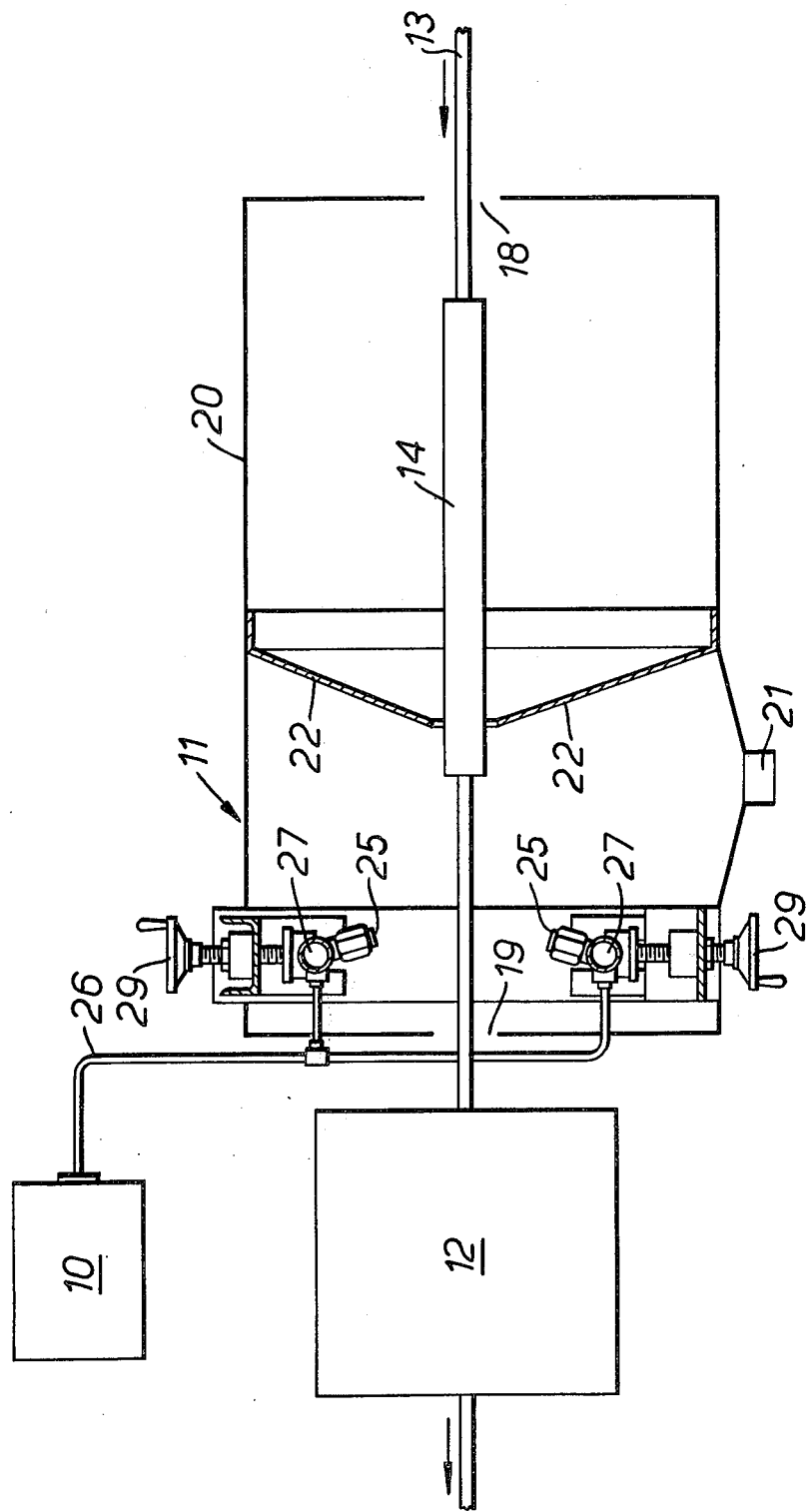

HEAT TREATMENT OF STEEL

This invention relates to the heat treatment of steel, and in particular to heat treatment in which steel is cooled from a temperature above the upper change point, as by quenching.

The invention is particularly applicable to the quenching of steel plates. It is generally undesirable that a cooled plate should have a layer of oxide scale on its surface, yet such scale will rapidly form on hot steel in the presence of oxygen, e.g. atmospheric oxygen, and will accordingly form if the plate is heated in air to the temperature from which it is to be quenched. The scale can be removed after the steel has cooled, for example by blasting with sand, grit or shot, but this involves an additional step in the manufacturing process and has other attendant disadvantages.

One solution to the problem is to avoid the formation of scale during the heating period prior to quenching by the use of a controlled atmosphere furnace. An initially scale-free plate is heated in the furnace in an atmosphere which is substantially free of oxygen, and the hot plate is transferred to the quenching rig and cooled sufficiently rapidly to avoid any substantial scale formation. However, such a furnace can be expensive to install and maintain and this process also requires the removal of surface scale prior to introducing the plates into the furnace.

An alternative approach is to heat the plate in air to the temperature from which it is to be quenched, allowing scale formation, and then to allow a combination of thermal shock from the quenching fluid and mechanical shock from the surfaces of the quench rig to achieve a degree of descaling in the quench rig itself. This may take place in, for example, a roller quench press where the quenching water and the action of the rollers combine to remove at least part of the scale, if this is not unduly adherent. One disadvantage of this procedure is that the scale may not be completely removed in all cases and this could give rise to lower and less uniform cooling rates together with an undesirable surface quality in the quenched plate. In some types of steel the scale may even be sufficiently adherent to prevent substantial removal by this treatment.

In accordance with the present invention there is provided a method of heat treating a steel body having surface scale in which a stream of water at an impact force of at least 2.5 kg/cm$^2$ is applied over the surface scale of the body at red heat or a higher temperature to remove the scale and the body is subsequently subjected to an accelerated cooling process from a temperature above its change point to a lower temperature through transformation.

The invention further provides apparatus for heat treating a steel body having surface scale, which apparatus comprises means for positioning the body, at red heat or a higher temperature, with respect to water supply means such that a stream of water from the supply means can be applied over the surface scale of the body at an impact force of at least 2.5 kg/cm$^2$ to remove the scale, and means for subsequently subjecting the body to an accelerated cooling process from a temperature above its change point to a lower temperature through transformation.

We have found that in the practice of the present invention the removal of surface scale prior to the accelerated cooling of the steel body can enable substantially higher cooling rates to be achieved in the accelerated cooling stage.

When carrying out the descaling step in the practice of the invention the steel body must be at an elevated temperature equivalent to red heat or higher. The minimum temperature may be about 800°C. Since the ease of descaling generally increases with increasing temperature, a more preferable minimum is about 900°C. However, it is preferred that the initial temperature is above the upper change point of the steel, otherwise a reheating step will be necessary before accelerated cooling through transformation. The actual temperature drop during the descaling operation will depend inter alia on the thickness of the steel body and the duration of the descaling period.

The body will normally be subjected to accelerated cooling from above its change point sufficiently soon after descaling to avoid substantial growth of new scale, and the operations of descaling and cooling are suitably carried out sequentially. It is possible to carry out the invention allowing the regions near the surface of the body to be cooled down substantially and the first stages of transformation to occur while descaling the body, and allowing transformation to complete after descaling, provided that accelerated cooling beyond that accomplished during descaling is applied within a short space of time and cooling is continuous through transformation. Thus if a body is passed directly from being descaled, which operation has commenced at a temperature above the change point to further accelerated cooling until transformation is substantially complete, the transformation may be allowed to start during descaling.

If after descaling the body as a whole has a temperature below the change point, an intermediate heating step will be required after descaling and before the body can be cooled from above the change point. Such heating should be carried out rapidly and in a manner which will minimise scale formation, for example in a reducing flame, by infra-red radiation or even in a controlled atmosphere furnace. Such heating may also be necessary in the case where temperature equalisation is allowed to take place after descaling the body to ensure that the whole of the body is above the upper change point before being subjected to accelerated cooling.

The invention is particularly suitable for steel plates, but is also applicable to other steel bodies, for example rolled sections. However, the more complex the shape of the body the more complex will be the arrangement of the high pressure water stream or streams to descale the whole of its surface.

After descaling the accelerated cooling takes place from a temperature above the upper change point ($Ar_3$). Preferably cooling takes place from up to 50°C. above the change point; the upper limit is determined by the usual metallurgical considerations. The cooling process will usually be a quenching process and carried out using water, but other quenching media, for example oil, oil/water or brine, could be used. Other accelerated cooling processes may be used in the method of the invention and include for example lead bath or air patenting of steel rod or wire. The heat treatment operation may extend beyond accelerated cooling and include for example tempering; thus a quenched plate may subsequently be reheated to a tempering temperature and air cooled.

The invention is not only applicable immediately after a reheating operation, but can for example be applied to a steel body immediately after rolling provided that its temperature is high enough.

The descaling operation uses a stream or streams of water at an impact force of at least 2.5 kg/cm², which must be distinguished from the much lower impact forces encountered in a conventional spray quench rig. In the performance of the invention the impact force will generally be from 3 to 5 or 6 kg/cm², the higher figures being particularly applicable for steels having tenacious scale such as some silicon killed steels. It is to be understood that the figures quoted for impact force represent the average force per unit area over the instantaneous area of impact of the stream of water on the steel body.

The descaling water is provided from a nozzle or preferably a plurality of nozzles connected to a high pressure water source and directed at the body. The nozzles and the body may be in fixed positions. Alternatively, a set of nozzles may be arranged across the width of the steel body, the spacing of the nozzles and shape and intensity characteristics of the stream from each nozzle being chosen to give a uniform supply of water across the surface of the body, and in order to apply water over the length of the body, either the set of nozzles may be moved from one end of the body to the other or, preferably, the body is moved lengthwise past the nozzles; however, it should be noted that a body of particularly irregular shape might not be suited to this procedure. In the case of a flat body, such as a plate, it may be particularly convenient to have one set of nozzles in a line across and above the body and a second set of nozzles in a line across and below the body and to pass the plate between the two sets. The body may be carried past the nozzles on rollers or securely clamped to a travelling carriage.

When descaling is to be effected with relative movement between the body and nozzles by moving the one across the other, it is advantageous to ensure that the speed of movement and the water delivery rate are correlated to give a water supply rate of at least 2 gm on every square centimetre of surface to be descaled.

The impact force of the water stream on the body is affected by the pressure in the water supply to the nozzle, the nozzle size, the angle at which the nozzle is set relative to the surface of the body and the distance between the nozzle and body.

The accompanying drawing is a schematic representation of one embodiment of the invention. Four major components are a source of high pressure water 10, a high pressure descaling unit shown generally at 11, a spray quench unit 12 and a set of rails 13 running through the descaling unit and the spray quench unit. The rails 13 support a carriage 14 on which a steel plate to be treated can be firmly supported while exposing its upper and lower surfaces.

The descaling unit 11 has an inlet 18 and an outlet 19 for the carriage. It is surrounded by a box 20 to contain the spray and as a safety measure. A drain 21 allows water and scale to flow out of the box. Baffles 22 prevent the steel plate from being cooled by low pressure deflected spray before it reaches the high pressure spray region.

The high pressure spray is provided by nozzles 25 supplied from the source of high pressure water 10 by flexible hoses 26 and pipes 27. The nozzles are arranged in upper and lower sets directed at the upper and lower surfaces of the plate. Each set of nozzles is independently adjustable for distance from the plate by adjusting screws 29.

The spray quench unit 12 is entirely conventional. Between it and the descaling unit a suitable reheating unit, as described above, can be interposed if desired.

Further details of the nozzle arrangement and water supply rates are given in the following illustrative examples in which 10 × 7 inches steel plates of thicknesses of approximately 1½, 1 and ½ inch were descaled and quenched. In each case the plate was held in a reheating furnace at 900°C. for one hour, removed from the furnace and after a delay of 20 to 30 seconds passed at a speed of 60 ft/min through a descaling unit and a spray quench rig. During descaling and quenching the temperature at the centre of each plate was monitored by an implanted thermocouple.

The de-scaling unit comprised three nozzles in line across the width of the plate both above and below the plate. Each nozzle gave a flat spray jet with a 26° included angle from a 2.0mm equivalent diameter hole. The nozzles were mounted at 140mm from the plate surfaces at 15° to the vertical pointing towards the plate as it enters the sprays, and the line of the flat spray on the plate was arranged to be at 15° to the line of the plate width.

The nozzles were connected to a water supply at a nominal pressure of about 2500 p.s.i. giving an impact force on the plate of about 5 kg/cm² and a water consumption on the plate surfaces of about 2.2 gm/cm². The nominal supply pressure of about 2,500 p.s.i. was closer to 2,200 p.s.i. at the nozzles, which may be compared with the typical supply pressure of 120 p.s.i. in the first zone of a conventional roller quench.

Table 1 shows the analysis of the plates treated. The plates referred to as ½ inch thick had actual thicknesses between 0.466 and 0.49 inch; the 1 inch plates were between 0.946 and 0.971 inch thick; and the 1½ inches plates were between 1.41 and 1.46 inches thick.

TABLE I

| | | | | | PLATE ANALYSIS | | | | | | | | |
|---|---|---|---|---|---|---|---|---|---|---|---|---|---|
| Thickness | C% | Si% | S% | P% | Mn% | Ni% | Cr% | Mo% | Cu% | Sn% | V% | Al Tot. | Al. Sol. |
| ½" | .215 | .25 | .017 | .014 | 1.56 | .06 | .045 | .03 | .11 | .011 | <.01 | .003 | .001 |
| 1" | .18 | .25 | .013 | .013 | 1.55 | .04 | .045 | .035 | .06 | .011 | <.01 | .014 | .008 |
| 1½" | .195 | .25 | .013 | .014 | 1.55 | .06 | .045 | .03 | .08 | .011 | <.01 | .010 | .010 |

Complete scale removal was achieved in the descaling unit. During descaling there was no detectable temperature drop at the centre of a 1 inch plate, while in a ½ inch plate a temperature drop of 50°–100°C. was observed. This was not a sufficient drop to initiate transformation in the descaling unit.

Five plates of ½ and 1½ inches and eight of 1 inch thickness were descaled and spray quenched as described above; the average cooling rates between 700°C and 300°C in the quench rig were as shown in Table II. This table also shows for comparison the cooling rates between the same temperatures and in the same quench rig of ½ inch and 1 inch plates which were not descaled prior to quenching.

TABLE II

| Plate Thickness | Cooling Rate °C/sec. (descaled) | | Cooling Rate (not descaled) °C/sec. | |
| --- | --- | --- | --- | --- |
| | Range | Ave. | Range | Ave. |
| ½" | 103–123 | 114 | 28.00–50.5 | 34.1 |
| 1" | 34.0–38.1 | 35.1 | 16.1–22.1 | 19.8 |
| 1½" | 16.7–18.2 | 17.3 | — | — |

The descaled and quenched plates had good surface qualtities, illustrating the attainment of clean surfaces together with good quench rates. It can be seen that the invention enables effective removal of scale to be achieved and increases the rate of heat transfer between the plate and the quenching medium thus increasing the quenching rate. The plates were suitable for subsequent tempering, coating or forming operations as required.

We claim:

1. A method of heat treating a steel body having surface scale comprising applying a stream of water at an impact force of at least 2.5 kg/cm² over substantially the whole of the surface of the body while it is red heat or higher temperature to remove the scale and subsequently subjecting the body without substantial further scale formation to a conventional accelerated cooling process from a temperature above its change point to a lower temperature through transformation to achieve a higher cooling rate during said conventional accelerated cooling process without descaling.

2. A method as claimed in claim 1 wherein the stream of water is provided from a nozzle or nozzles past which the body is moved.

3. A method as claimed in claim 1 wherein the body is a steel plate.

4. A method as claimed in claim 1 wherein the impact force of the stream of water is from 3 to 6 kg/cm².

5. A method as claimed in claim 1 wherein the water is supplied at a rate of at least 2 gm on every square centimeter of surface to be descaled.

6. A method as claimed in claim 1 wherein the stream of water is applied over the surface scale while the body is at a temperature of at least 900°C.

7. A method as claimed in claim 1 wherein the stream of water is applied over the surface scale while the body is at a temperature above the upper change point of the body.

8. A method as claimed in claim 1 wherein after removal of the surface scale the body is passed directly to said conventional accelerated cooling process.

9. A method as claimed in claim 8 wherein the first stages of transformation are allowed to occur while descaling the body and cooling through transformation is completed in the conventional accelerated cooling process, cooling being continuous through transformation.

10. A method as claimed in claim 1 wherein after removal of the surface scale and before subjecting the body to the conventional accelerated cooling process the body is reheated to a temperature above the upper change point in a manner which will minimise scale formation.

11. A method as claimed in claim 10 wherein the body is reheated in a reducing flame or by infra-red radiation.

12. A method as claimed in claim 1 wherein the conventional accelerated cooling process is a quenching process.

13. A method as claimed in claim 12 wherein the quenching medium is water, oil, oil/water or brine.

* * * * *

UNITED STATES PATENT OFFICE
CERTIFICATE OF CORRECTION

Patent No. 3,928,090　　　　　　　　Dated　　December 23, 1975

Inventor(s)　　　Keith Randerson

It is certified that error appears in the above-identified patent and that said Letters Patent are hereby corrected as shown below:

Column 5, line 36 (Claim 1, line 11) after "process" insert

---than would be obtained by said conventional accelerated cooling process---

Signed and Sealed this

Tenth Day of August 1976

[SEAL]

Attest:

RUTH C. MASON
*Attesting Officer*

C. MARSHALL DANN
*Commissioner of Patents and Trademarks*